United States Patent [19]

Sasaki et al.

[11] Patent Number: 4,835,639
[45] Date of Patent: May 30, 1989

[54] ROTARY MAGNETIC DISC DEVICE HAVING A COMPACT LOCKING DEVICE

[75] Inventors: Hidemi Sasaki, Tokyo; Naoki Kobayashi, Omiya, both of Japan

[73] Assignee: Fuji Photo Film Co., Ltd., Kanagawa, Japan

[21] Appl. No.: 106,216

[22] Filed: Oct. 9, 1987

[30] Foreign Application Priority Data

Oct. 29, 1986 [JP] Japan ................. 61-257658

[51] Int. Cl.⁴ ............................................. G11B 17/02
[52] U.S. Cl. ................................................... 360/99.06
[58] Field of Search .................. 360/97, 99; 369/270

[56] References Cited

U.S. PATENT DOCUMENTS

| | | | |
|---|---|---|---|
| 4,656,542 | 4/1987 | Shibata | 360/99 |
| 4,665,453 | 5/1987 | Mikamoto et al. | 360/99 |
| 4,686,594 | 8/1987 | Kurafuji | 360/99 |
| 4,694,362 | 9/1987 | Oosaka et al. | 360/97 |
| 4,700,247 | 10/1987 | Shibata | 360/99 |
| 4,750,063 | 6/1988 | Kume et al. | 360/99 |

Primary Examiner—Robert S. Tupper
Attorney, Agent, or Firm—Sughrue, Mion, Zinn, Macpeak & Seas

[57] ABSTRACT

A rotary magnetic disc device for use in an electronic still camera or the like employing a magnetic disc pack which comprises a main body, a pack holder for storing the magnetic disc pack therein and a cover disposed outside of the pack holder, the pack holder and the cover being respectively mounted to the device main body such that they can be opened or closed freely. Engagement means is provided in the tip end portion of an erect member adapted to extend through an opening in the magnetic disc pack to be stored in the pack holder when the pack holder is closed and, on the other hand, a lock member engageable with the engagement means is provided on the lower surface of the cover, so that the cover can be locked by means of the engagement means of the erect member and the lock member in the cover.

7 Claims, 7 Drawing Sheets

ROTARY MAGNETIC DISC DEVICE HAVING A COMPACT LOCKING DEVICE

BACKGROUND OF THE INVENTION

1. Field of the Invention

The present invention relates to a rotary magnetic disc device and, in particular, to a rotary magnetic disc device which is suitable for use in a magnetic recording-/reproducing apparatus in an electronic still camera or the like.

2. Description of the Related Art

Recently, there has been developed an attractive electronic still camera system in which an image pickup device such as a solid image pickup element, an image pickup tube or the like is combined with a recording device employing as a recording medium thereof an inexpensive magnetic disc having a relatively larger storage capacity such that an object can be still photographed electronically and recorded into a rotating magnetic disc and the reproduction of the recorded image can be performed by means of a television system, a printer or the like which is provided separately from the electronic still camera system.

The magnetic disc that is employed in such camera system is usually used in the form of a magnetic disc pack. In the magnetic disc pack there is rotatably stored a magnetic disc which is capable of magnetic recording of still image information or the like, and such magnetic disc pack is used after it is mounted to a rotary magnetic disc device which is incorporated in an electronic camera.

When the magnetic disc pack is mounted to the magnetic recording or reproducing apparatus in the electronic camera, it is troublesome and inconvenient to directly mount or locate a central bore, which is formed in a center core disposed in the central portion of the magnetic disc within the magnetic disc pack, onto a rotary drive shaft which is positioned on the side of the magnetic recording or reproducing apparatus. For this reason, such locating operation may result in the inaccurate mounting of the magnetic disc pack to the magnetic recording or reproducing apparatus.

In order to eliminate the above-mentioned problem, conventionally, there has been proposed a magnetic disc pack loading/unloading device which comprises a cover supported to the main body of the magnetic recording or reproducing apparatus such that it can be freely opened or closed, and a pack holder which can be operated cooperatively with the cover and in which the magnetic disc pack can be stored. In the magnetic disc pack loading/unloading device, by closing the cover after insertion of the magnetic disc pack into the pack holder, a magnetic disc in the magnetic disc pack within the pack holder can be mounted to the rotary drive shaft of the main body of the magnetic recording or reproducing apparatus.

In the above-mentioned magnetic disc pack loading-/unloading device, there is necessary lock means which permits the rotary magnetic disc device to move into its magnetic recording or reproducing state by closing the cover and also which is able to hold the cover in the closed position thereof against the energizing force of a return spring during the magnetic recording or reproducing operation of the rotary magnetic disc device.

However, in the above-mentioned conventional rotary magnetic disc device, due to the fact that the lock means to hold the cover in the closed position thereof is located in the front edge or side edge of the cover, there requires an extra space for the lock means on the outside portion of the cover. Also, when the lock means is located in the front edge of the cover, it is inconvenient to insert or discharge the magnetic disc pack. In addition, the lock means located in the cover front edge impairs the appearance of the rotary magnetic disc device.

SUMMARY OF THE INVENTION

The present invention aims at eliminating the drawbacks found in the above-mentioned prior art rotary magnetic disc devices.

Accordingly, it is an object of the invention to provide an improved rotary magnetic disc device which is capable of provision of a lock mechanism for a cover in the space of a magnetic disc pack.

In order to accomplish the above object, according to the invention, there is provided a rotary magnetic disc device which comprises a cover journaled to the main body of the rotary magnetic disc device such that it can be freely opened or closed; a pack holder located inside of the cover, journaled to the device main body in a freely openable or closable manner, and formed in such a shape as to be able to store a magnetic disc pack therein, the pack holder being closable in connection with the closing operation of the cover to guide a magnetic disc contained within the magnetic disc pack stored therein to a position in which the magnetic disc can be brought into engagement with a rotary drive shaft of the device main body; an erect member provided erectly in the device main body and formed with engagement means in the tip end thereof such that, when the pack holder is closed, the erect member is able to extend through an opening formed in the magneic disc pack to be stored in the pack holder; and a lock member located on the lower surface of the cover and engageable with the engagement means of the erect member when the cover is closed.

In the present invention, the cover can be secured by use of the erect member extendable through the opening of the magnetic disc pack such as a positioning pin adapted to position the magnetic disc pack or the rotary drive shaft, so that the lock means can be arranged in the space of the magnetic disc pack.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a rotary magnetic disc device in accordance with the present invention with reference to the accompanying drawings.

Figure 1:
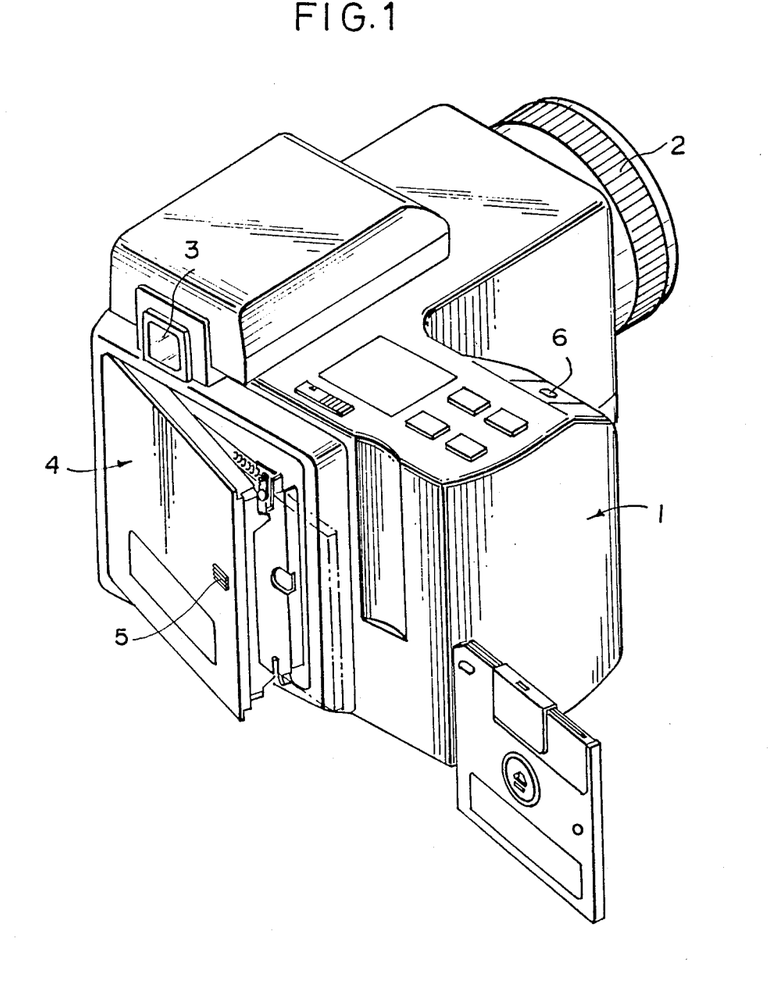
FIG. 1 is a perspective view to show the structure of the appearance of an electronic still camera to which the present invention is applied.

Referring first to FIG. 1, there is illustrated a general structure of an electronic still camera to which a rotary magnetic disc device of the invention is applied. In this figure, reference numeral 1 designates a camera body, 2 a photographing lens mount, 3 a finder, 4 a rotary magnetic disc device, 5 a knob for opening or closing a cover of the rotary magnetic disc device, and 6 a shutter release button of the electronic still camera.

Next, the structure of a magnetic disc pack to be mounted onto the rotary magnetic disc device 4 will be described in connection with FIGS. 2 and 3.

Figure 2:
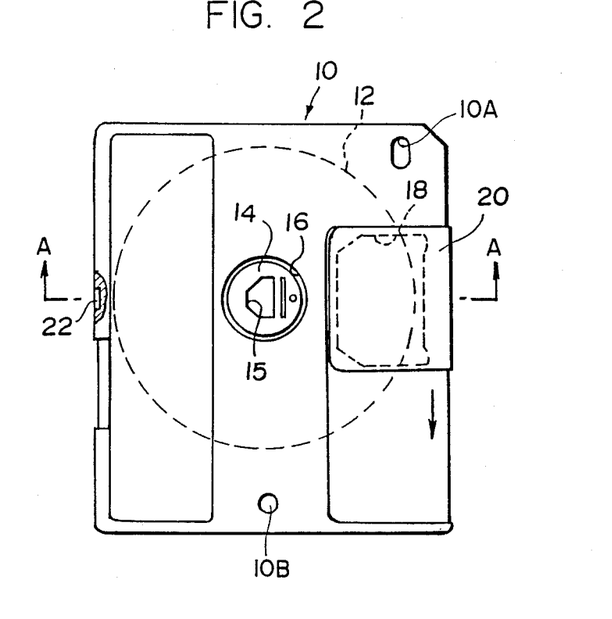
FIG. 2 is a plan view of a magnetic disc pack employed in a rotary magnetic disc device according to the invention and also used in a magnetic recording/reproducing apparatus.
Figure 3:
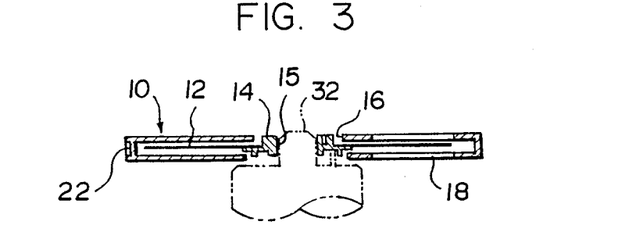
FIG. 3 is a section view of the above magnetic disc pack, taken along A—A line in FIG. 2.

In FIG. 2, there is shown a plan view of the magnetic disc pack and, in FIG. 3, there is shown a section view of the magnetic disc pack taken along a line A—A in FIG. 2. the magnetic disc pack 10 is formed in a substantially square shape and, within the square-shaped disc pack 10, there is rotatably stored a magnetic disc 12 into which still image information or the like can be recorded. In the central part of the magnetic disc 12 there is provided a center core 14 which serves a reinforcing member of the magnetic disc 12. The center core 14 is exposed externally from a circular opening formed in the magnetic disc pack 10. In the magnetic disc pack 10 there is formed a window portion 18 in which a magnetic head is to be positioned, and the window portion 18 for a magnetic head can be opened or closed by means of a slidable shutter 20. That is, before the magnetic disc pack 10 is inserted into a pack holder 26, the shutter 20 closes the window portion 18 to prevent the magnetic disc 12 from being attached by dust. After the pack 10 is inserted into the pack holder 26, the shutter 20 moves in a downward direction in FIG. 2 to open the magnetic head window portion 18, thereby permitting recording into or reproducing from the magnetic disc 12. In FIGS. 2 and 3, reference numerall 22 designates a recessed portion which is used to provisionally engage the magnetic disc pack 10 within the pack holder 26.

Figure 4:
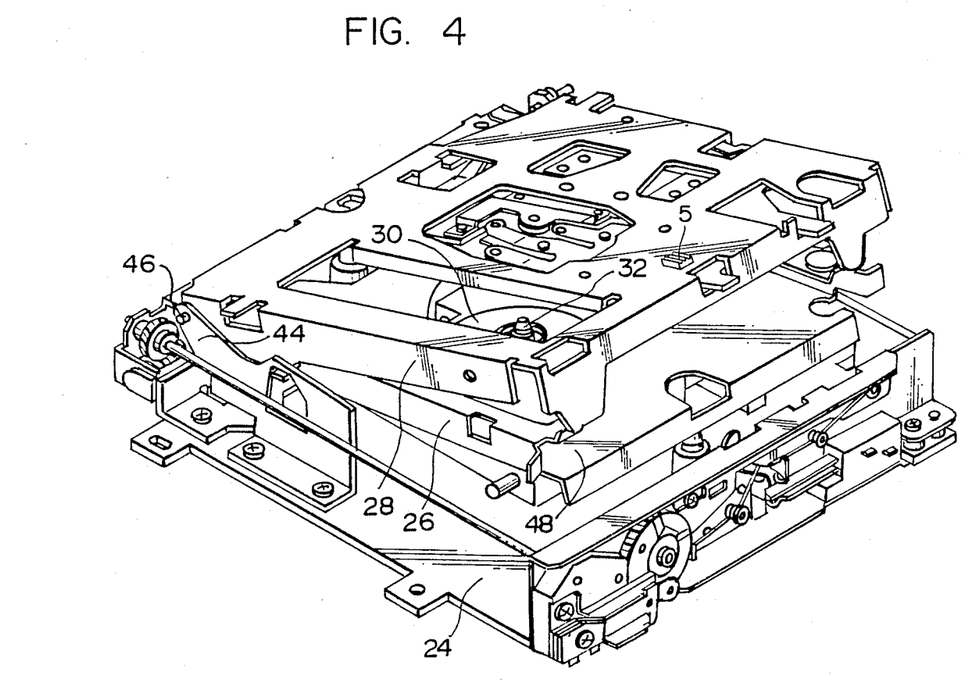
FIG. 4 is a perspective view to show the state of the rotary magnetic disc device used in the electronic still camera shown in FIG. 1, in which the cover of the rotary magnetic disc device is opened.
Figure 5:
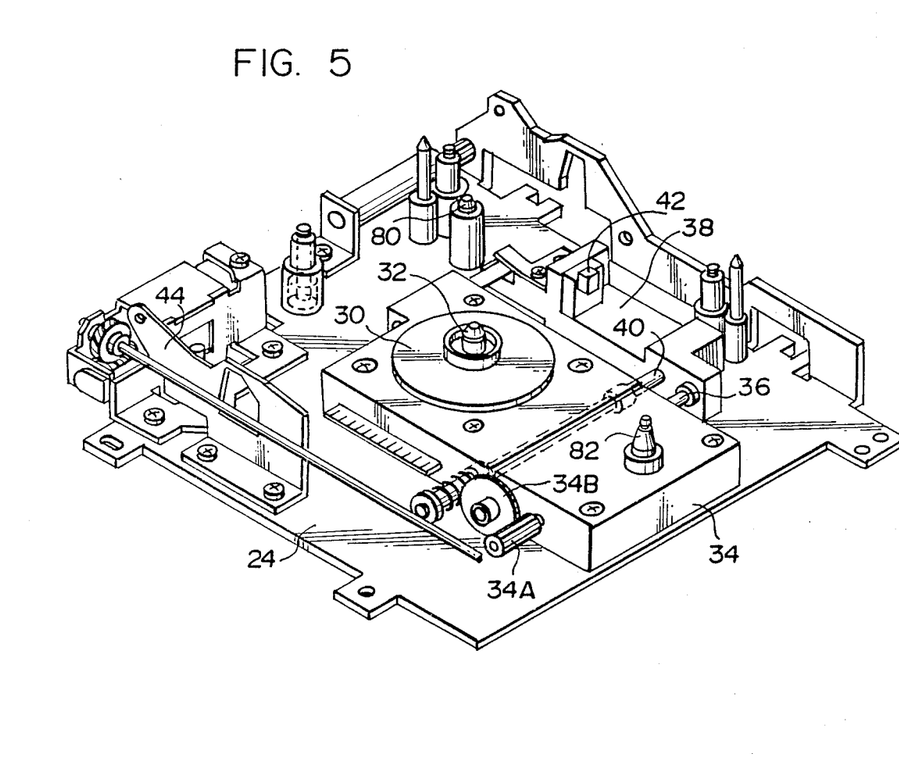
FIG. 5 is a perspective view to show the internal structure of the rotary magnetic disc device.

Referring now to FIGS. 4 and 5, there is shown an embodiment of the internal structure of a rotary magnetic disc drive according to the invention, and the illustrated embodiment comprises a main body 24 of the rotary magnetic disc device, a pack holder 26 and a cover 28.

At first, referring to the structure of the device main body 24, within the device main body 24, there is provided a motor 30 which is used to drive the magnetic disc. The magnetic disc drive motor 30 has a drive shaft 32 adapted such that it can be inserted through a central bore 15 (as shown in FIG. 3) formed in the center core 14 provided in the magnetic disc pack 10 to rotate the magnetic disc 12 at a given number of rotations within the magnetic disc pack 10. Also, in FIG. 5, reference numeral 34 designates a motor which is used to feed a magnetic head, 36 a lead screw which is connected through gears 34A, 34B to the output shaft of the head feed motor 34, 38 a head carriage which is threadedly engageable with the lead screw 36 and also can be guided and moved by a guide shaft 40, and 42 a magnetic head provided on the head carriage 38. In such structure, therefore, if the motor 34 is rotated at every number of rotations, then the head carriage 38 is moved at every given pitch in the axial direction of the guide shaft 40 due to the rotation of the lead screw 36 and, as a result of this, the magnetic head 42 is moved in the radial direction of the magnetic disc 12 so as to be able to record or reproduce still image information into or from the magnetic disc 12, in particular, each of tracks formed in the magnetic disc 12.

The device main body 24 is provided in the end portions thereof with brackets 44, 44, respectively, (in FIG. 4, only one of the brackets is shown). And, the pack holder 26 and the cover 28 are pivotally supported on the brackets 44, 44 by means of pins 46. The cover 28 is being energized with respect to the device main body 24 in the opening direction thereof by a spring which is not shown. Also, between the cover 28 and the pack holder 26, there is interposed another spring which is energizing the pack holder 26 in a direction to part the pack holder 26 from the cover 28. For this reason, as shown in FIG. 4, in the state where the cover is open, the pack holder 26 is allowed to part from the device main body 24 and the cover 28 to thereby open the magnetic disc pack insertion opening 48 of the pack holder 26.

On the device main body 24, there are erected pins 80, 82 which are respectively used to position the magnetic disc pack 10. These magnetic disc pack positioning pins 80, 82 can be inserted respectively into their associated positioning holes 10A, 10B respectively formed in the above-mentioned magnetic disc pack 10 so as to position the magnetic disc pack 10 at a predetermined position.

On the surface of the pack holder 26 that is opposed to the device main body 24, there are formed openings into which the drive or rotary shaft 32, magnetic head 42, positioning pins 80, 82 and the like respectively arranged on the device main body 24 can be inserted, respectively.

Figures 6, 7, 8:
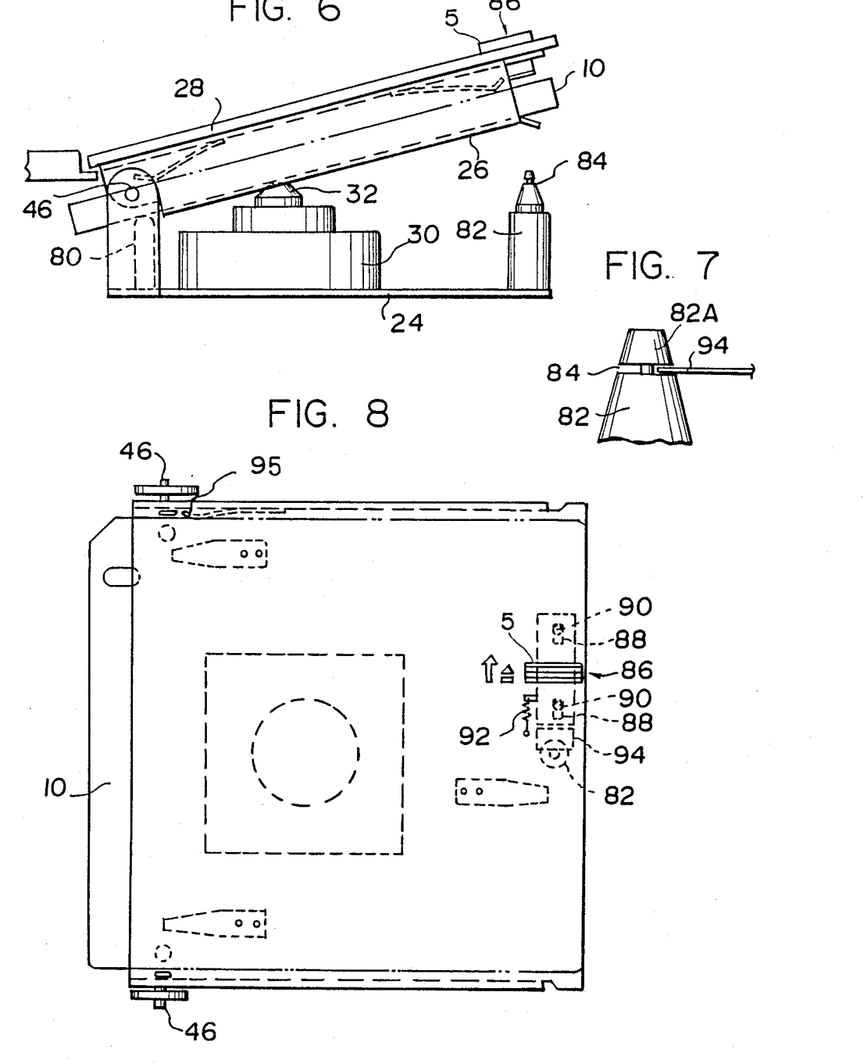
FIG. 6 is a side view of the rotary magnetic disc device while the cover of the rotary magnetic disc device is opened.
FIG. 7 is an enlarged view of the upper end of a positioning pin employed in the invention.
FIG. 8 is a plan view of the rotary magnetic disc device according to the invention.

The positioning pin 82 shown in FIG. 6 is formed with an engagement groove 84, the details of which are illustrated in FIG. 7.

On the other hand, the cover 28 is provided with a lock member 86 having a knob 5 for opening the cover 28 such that the lock member 86 can be slided freely in a vertical direction in FIG. 8. That is, in the lock member 86, there are formed elongated holes 88, 88 and thus the lock member 86 is mounted to the cover 28 by means of pins 90, 90 which can be inserted into the elongated holes 88, 88, respectively. As a result of this, the lock member 86 can be moved by a distance, that is, a room left within the elongated holes 88 by operating the cover opening knob 5. In addition, the lock member 86 is provided with a spring 92 so that the lock member 86 is being energized in a direction facing to the positioning pin 82 by this spring 92. The lock member 86 is further provided in the tip end portion thereof with an engagement portion 94 which is formed in such a shape that it can be fitted into the engagement groove 84 in the positioning pin 82. Referring further to FIG. 8, a reference numeral 95 designates a spring which is used to energize the magnetic disc pack 10 from the lateral side thereof.

Figure 9:
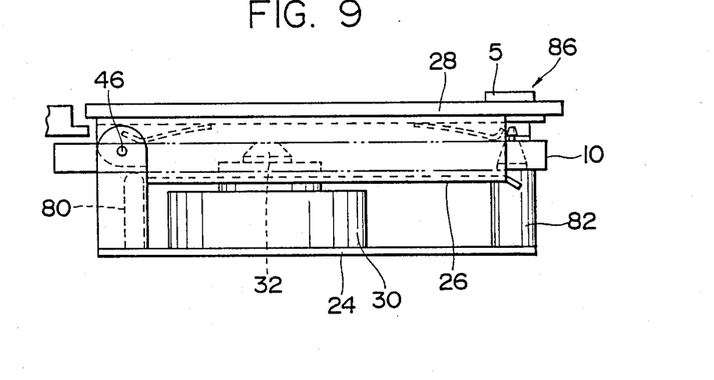
FIG. 9 and 10 are respectively side and front views of the rotary magnetic disc device while the cover thereof is closed.
Figure 10:
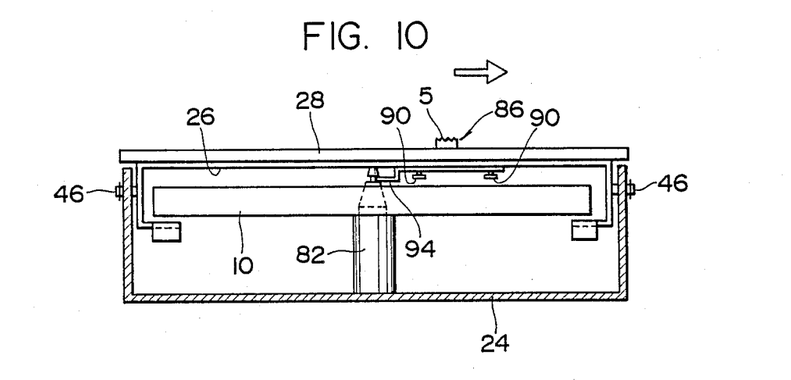

Now, the illustrated embodiment of a rotary magnetic disc device constructed in the above-mentioned manner in accordance with the invention can be operated in the following way: That is, at first, in the open state of the rotary magnetic disc device as shown in FIG. 6, the magnetic disc pack 10 is inserted into the pack holder 26. After the magnetic disc pack 10 is completely inserted into the pack holder 26, if the cover 28 of the rotary magnetic disc device is pressed down toward the device main body 24, then the pack holder 26 existing internally of the cover 28 is also pressed downward cooperatively with the cover 28, so that the positioning pins 80, 82 and the rotary drive shaft 32 can be inserted into the positioning hole 10A, center core central bore 15 and positioning hole 10B of the magnetic disc pack 10 within the pack holder 26 in the order of the positioning pin 80, drive shaft 32 and positioning pin 82, respectively. Then, if the cover 28 is further pressed down, then the tip end engagement portion 94 of the lock member 86 provided in the cover 28 is brought into contact with the tip end portion 82A of the positioning pin 82 that has a tapered surface as shown in FIG. 7, so that the lock member 86 is moved in an upward direction in FIG. 8 against the energizing force of the spring 92. If the cover 28 is still further depressed, then the engagement portion 94 of the lock member 86 is fitted into the positioning pin engagement groove 84, so that, in this position, the cover 28 is engaged by the positioning pin 82 erected on the side of the device main body 24. This engaged state is shown in FIGS. 9 and 10 and this is the magnetic recording/reproducing state.

Figure 11:
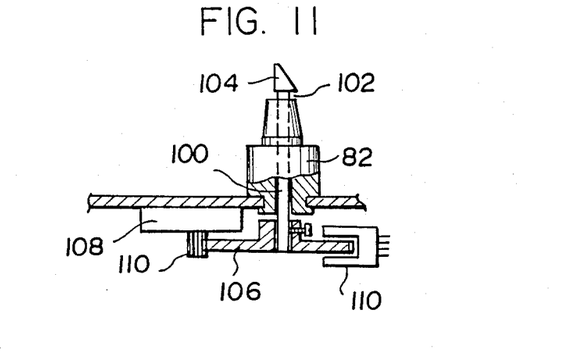
FIG. 11 is a section view of a second embodiment of a rotary magnetic disc device according to the invention; and, FIG. 12 is a plan view of the above second embodiment.
Figure 12:
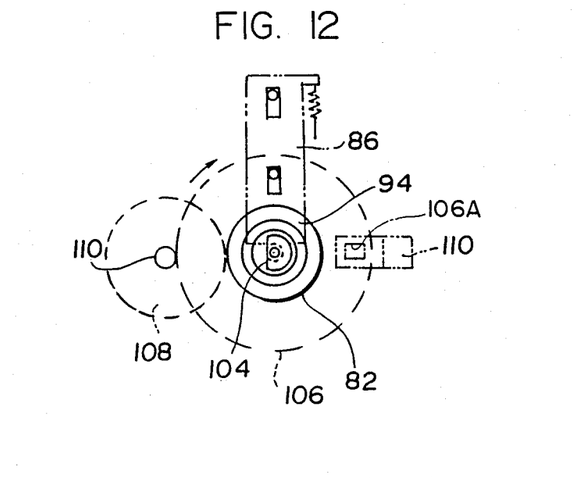

Referring now to FIGS. 11 and 12, there is shown the structure of a second embodiment of a rotary magnetic disc device according to the invention. In this second embodiment, within the positioning pin 82 there is provided an internal shaft 100 such that it is free to slide. Between the tip end portion of the internal shaft 100 and the positioning pin 82 there is formed an engagement groove 102. Also, in the tip end portion of the internal shaft 100 there is provided a cut surface 104 which can be formed by cutting out a circular cone in the vertical direction thereof. Further, in the lower end portion of the internal shaft 100 there is provided a gear 106 which is threadedly engaged with a gear 110 provided in the output shaft of the motor 108. Therefore, if the motor 108 is rotated, then the internal shaft 100 is rotated by means of the gears 110, 106 and thus the cut surface 104 is rotated 90° in a clockwise direction from the position thereof shown in FIG. 12, so that, when the lock member 86 is removed from the engagement groove 102, then the cover 28 can be automatically opened. With respect to the rotational position of the internal shaft 100, there is provided a photo-interrupter 110 and the position of a slit bore 106A formed in the gear 106, that is, the position of the cut surface 104 can be determined with accurary.

According to the above-mentioned second embodiment of the invention, the opening of the cover 28 can be controlled electrically and, therefore, there is eliminated the need of the cover opening knob 5 provided in the lock member 86 in the first embodiment of the invention.

In the above-mentioned embodiments, the engagement groove formed in the upper end portion of the positioning pin 82 is used to hold the cover 28 in its closed position but, however, the invention is not limited to this. Alternatively, the central, non-rotary portion of the rotary drive shaft 32 of an outer rotor type can be used; for example, an engagement groove is formed in the non-rotary portion for locking the cover 28. In other words, any means can be used which uses a member extending through the magnetic disc pack during the closed state of the cover to lock the cover.

As has been described heretofore, according to the rotary magnetic disc device of the invention, due to the fact that erect members erected on the side of the device main body so as to extend through the opening portion of the magnetic disc pack are used to lock the cover in its closed position, there is eliminated the need of a space for the lock member that is provided outwardly of the cover in the prior art, so that the rotary magnetic disc device can be formed compact as well as the lock member provides no obstable to the magnetic disc pack when the magnetic disc pack is inserted into or discharged from the pack holder. That is, the present invention has several advantages over the prior art.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. a rotary magnetic disc device comprising:
   a main body having a rotary drive shaft;
   a cover journaled to said main body of said rotary magnetic disc device in such a manner that it can be freely opened or closed;
   a pack holder located internally of said cover, journaled to said device main body in such a manner that it can be freely opened or closed, and formed in such a shape as to be able to store a magnetic disc pack therein, said pack holder being adapted to be closed in connection with the closing operation of said cover to guide a magnetic disc contained within said magnetic disc pack stored therein to a position where said magnetic disc can be engaged with said rotary drive shaft of said device main body, said magnetic disc having a center core with a center bore formed therethrough;
   an erect member erected on said device main body and provided with engagement means in a tip end portion thereof, said erect member being adapted to extend through an opening formed in said magnetic disc pack to be stored in said pack holder when said pack holder is closed; and,
   a lock member disposed on a lower surface of said cover and engageable with said engagement means of said erect ember when said cover is closed.

2. A rotary magnetic disc device as set forth in claim 1, wherein said erect member is a positioning pin which can be inserted into a positioning hole formed in said magnetic disc pack.

3. A rotary magnetic disc device as set forth in claim 1, wherein said erect member is the non-rotary portion of said rotary drive shaft of said device main body that can be inserted into said center bore formed in said center core provided in said magnetic disc.

4. A rotary magnetic disc device as set forth in claim 1, wherein said engagement means in said erect member is an engagement groove formed in the periphery of the tip end portion of said erect member.

5. A rotary magnetic disc device as set forth in claim 1, wherein said lock member is freely slidable in such directions as to be engageable with as well as to be removable from said engagement means in said erect means and said lock member is also being energized in said engagement direction by a spring.

6. A rotary magnetic disc device as set forth in claim 5, wherein said lock member is provided with an integral knob for opening said cover and said cover opening knob is disposed so as to project from the upper surface of said cover.

7. A rotary magnetic disc device as set forth in claim 1, wherein said engagement means in said erect member is located in a central portion of said erect member such that it is free to rotate, said engagement means comprising a shaft provided with an engagement portion in a part of the periphery of the tip end portion thereof and drive means adapted to rotate said shaft to a position in which said shaft can be engaged with said lock member or disengaged therefrom.

* * * * *